(12) United States Patent
Stein (10) Patent No.: US 9,990,209 B2
(45) Date of Patent: Jun. 5, 2018

(54) DIGITAL ASSISTANCE DEVICE FOR FACILITATING MULTI-STAGE SETUP

(71) Applicant: Microsoft Technology Licensing, LLC, Redmond, WA (US)

(72) Inventor: Torsten Stein, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 14/939,929

(22) Filed: Nov. 12, 2015

(65) Prior Publication Data

US 2017/0139720 A1    May 18, 2017

(51) Int. Cl.
*G06F 9/44* (2018.01)
*H04L 12/24* (2006.01)

(52) U.S. Cl.
CPC ........ *G06F 9/4411* (2013.01); *H04L 41/0876* (2013.01)

(58) Field of Classification Search
CPC .......................... H04L 41/0876; G06F 9/4411
See application file for complete search history.

(56) References Cited

U.S. PATENT DOCUMENTS

| | | | |
|---|---|---|---|
| 7,143,151 B1 | 11/2006 | Kayashima et al. |
| 7,162,733 B2 | 1/2007 | Kamieniecki |
| 7,565,418 B2 | 7/2009 | Ferrari et al. |
| 2008/0244563 A1 | 10/2008 | Sonkin et al. |
| 2012/0108230 A1 | 5/2012 | Stepanian |
| 2013/0067120 A1 | 3/2013 | Forrest, III et al. |
| 2013/0191755 A1 | 7/2013 | Balog et al. |
| 2014/0080466 A1 | 3/2014 | Shih |
| 2014/0108073 A1 | 4/2014 | Castel et al. |
| 2014/0337493 A1 | 11/2014 | Tung |
| 2015/0023183 A1 | 1/2015 | Ilsar et al. |
| 2015/0023336 A1 | 1/2015 | Ilsar et al. |
| 2015/0121470 A1 | 4/2015 | Rongo et al. |

(Continued)

FOREIGN PATENT DOCUMENTS

| | | |
|---|---|---|
| WO | 2012168263 A1 | 5/2012 |
| WO | 2013137660 | 9/2013 |

OTHER PUBLICATIONS

"Clearpass Onboard", Published on: Aug. 10, 2014 Available at: http://www.arubanetworks.com/pdf/products/DS_ClearPass_Onboard.pdf.

(Continued)

*Primary Examiner* — Albert Wang
(74) *Attorney, Agent, or Firm* — Workman Nydegger (57) ABSTRACT

A digital assistance device that at least partially automatically sets up a device so as to operate within a system of one or more other devices. The digital assistance device at least partially automates the setup process that would usually come in a quick start guide. This is made possible by digitalizing the quick start guide so as to be interpretable by the digital assistance device. The digital assistance device can thereby determine, for each step, what it can do based on its information and capability, but also how the instructions can be simplified based on what it knows, and for what it cannot do, it passes all or a portion of the quick start guide for that step to the user via an interactive interface. Accordingly, potential manual setup tasks are offloaded to automation, thereby simplifying the setup of a device through technical automation.

20 Claims, 6 Drawing Sheets

(56) References Cited

U.S. PATENT DOCUMENTS

2015/0172262 A1 6/2015 Ortiz
2015/0317467 A1* 11/2015 Rattner .................. G06F 21/34
　　　　　　　　　　　　　　　　　　　　　　　726/5

OTHER PUBLICATIONS

"Onboarding Service", Published on: Dec. 22, 2014 Available at: https://allseenaliance.org/developers/learn/base-services/onboarding.
International Search Report and the Written Opinion issued in PCT Application No. PCT/US2016/060743 dated Feb. 3, 2017.

* cited by examiner

DIGITAL ASSISTANCE DEVICE FOR FACILITATING MULTI-STAGE SETUP

BACKGROUND

Computing systems and associated networks have revolutionized the way human beings work, play, and communicate. Nearly every aspect of our lives is affected in some way by computing systems. Conventional computing systems now take a wide variety of form factors are presently commercially available. For instance, smartphone and other handheld devices operate sophisticated processors to operate complex software. Computing systems are even now taking the form of various wearables, such as armbands, glasses, and so forth. Such small devices even often have the capability with communicating with one or more other devices through mostly wireless networks.

When such devices interact with other devices or collection of devices, the functionality of the collective whole can be greatly enhanced. For instance, a wristband that keeps time and takes biometric measurements need not rely just on its own processing, storage, and display capability for processing and reporting biometric measurements to a user. Rather, an account may be set up for the user on a local laptop or desktop computer, or in the cloud in a cloud computing environment, so as to allow more complex processing, greater storage, and more robust interaction with a user.

Nevertheless, it is often difficult, or at least more than trivial, for a user to connect a newly purchased device with an existing system of one or more devices. Typically, newly purchased devices will come with an instruction manual—perhaps a quick start guide. However, even the instruction manual is often difficult to follow, relies on the user knowing information that the user might not be immediately sure of, and can sometimes be frankly time consuming and frustrating for a user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a digital assistance device that at least partially automatically sets up a device so as to operate within a system of one or more other devices. The digital assistance device at least partially automates the setup process that would usually come in a quick start guide. This is made possible by digitalizing the quick start guide so as to be at least partially interpretable by the digital assistance device. The digital assistance device can thereby determine, for each step, what it can do based on its information and capability, but also how the instructions can be simplified based on what it knows, and for what it cannot do, it passes all or a portion of the quick start guide for that step to the user via an intractable interface. Accordingly, potential manual setup tasks are offloaded to automation, thereby simplifying the setup of a device through technical automation.

Upon determining that a particular device is to be set up within a system, the digital assistance device obtains recorded setup instruction describing instructions for multiple stages of setup of the particular device within the system. As an example, when a device provider releases a new device, the provider might provide setup instructions for setting up the new device with multiple different systems for each of those systems. They may then upload those digitized instructions into a store in a cloud computing environment. Wherever the instructions are placed, the digital assistance device obtains the setup instructions for the appropriate device to be set up, and the appropriate system into which the device is to be set up.

To perform the setup, the digital assistance device interprets the setup instructions in multiple stages. For one or more of the stages, the digital assistance device performs tasks automatically using perhaps state that is present on the digital assistance device. For instance, the digital assistance device may auto-populate certain fields such as cellular provider, zip code, and so forth. However, for one or more of the stages, the digital assistance device cannot perform a task, and so provides human readable instructions to the user. Thus, the setup instructions are a hybrid of machine-readable instructions, and human-readable instructions, such as multi-media data.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to a digital assistance device that at least partially automatically sets up a device so as to operate within a system of one or more other devices. The digital assistance device at least partially automates the setup process that would usually come in a quick start guide. This is made possible by digitalizing the quick start guide so as to be at least partially interpretable by the digital assistance device. The digital assistance device can thereby determine, for each step, what it can do based on its information and capability, but also how the instructions can be simplified based on what it knows, and for what it cannot do, it passes all or a portion of the quick start guide for that step to the user via an intractable interface. Accordingly, potential manual setup tasks are offloaded to automation, thereby simplifying the setup of a device through technical automation.

Upon determining that a particular device is to be set up within a system, the digital assistance device obtains recorded setup instruction describing instructions for multiple stages of setup of the particular device within the system. As an example, when a device provider releases a new device, the provider might provide setup instructions for setting up the new device with multiple different systems for each of those systems. They may then upload those digitized instructions into a store in a cloud computing environment. Wherever the instructions are placed, the digital assistance device obtains the setup instructions for the appropriate device to be set up, and the appropriate system into which the device is to be set up.

To perform the setup, the digital assistance device interprets the setup instructions in multiple stages. For one or more of the stages, the digital assistance device performs tasks automatically using perhaps state that is present on the digital assistance device. For instance, the digital assistance device may auto-populate certain fields such as cellular provider, zip code, and so forth. However, for one or more of the stages, the digital assistance device cannot perform a task, and so provides human readable instructions to the user. Thus, the setup instructions are a hybrid of machine-readable instructions, and human-readable instructions, such as multi-media data.

Some introductory discussion of a computing system will be described with respect to FIG. 1. Then, the use of a digital assistance device to at least partially automated setup of a device to operate within a system will be described with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
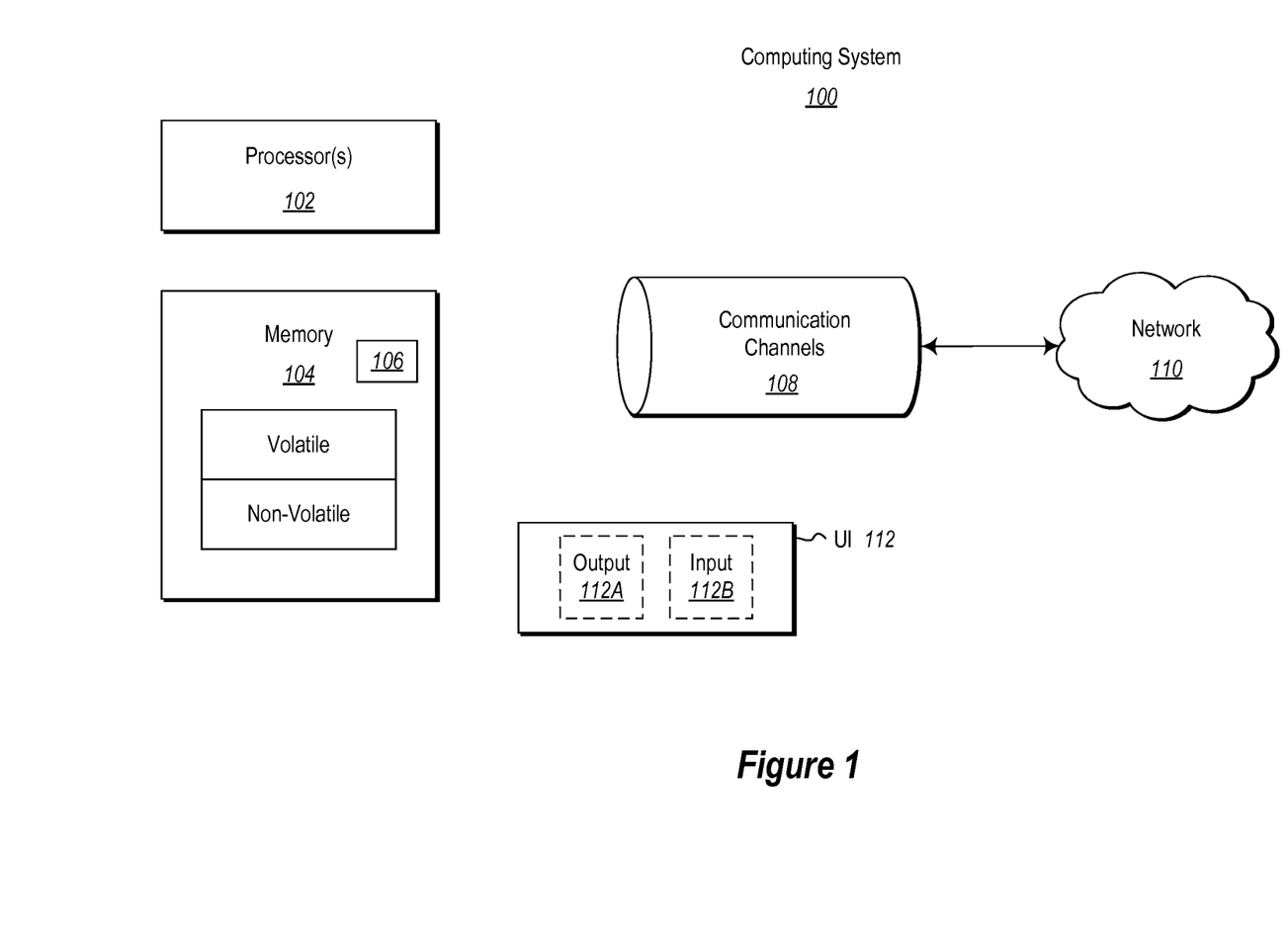
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module" or the like may also be used. As used in this description and in the case, these terms are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
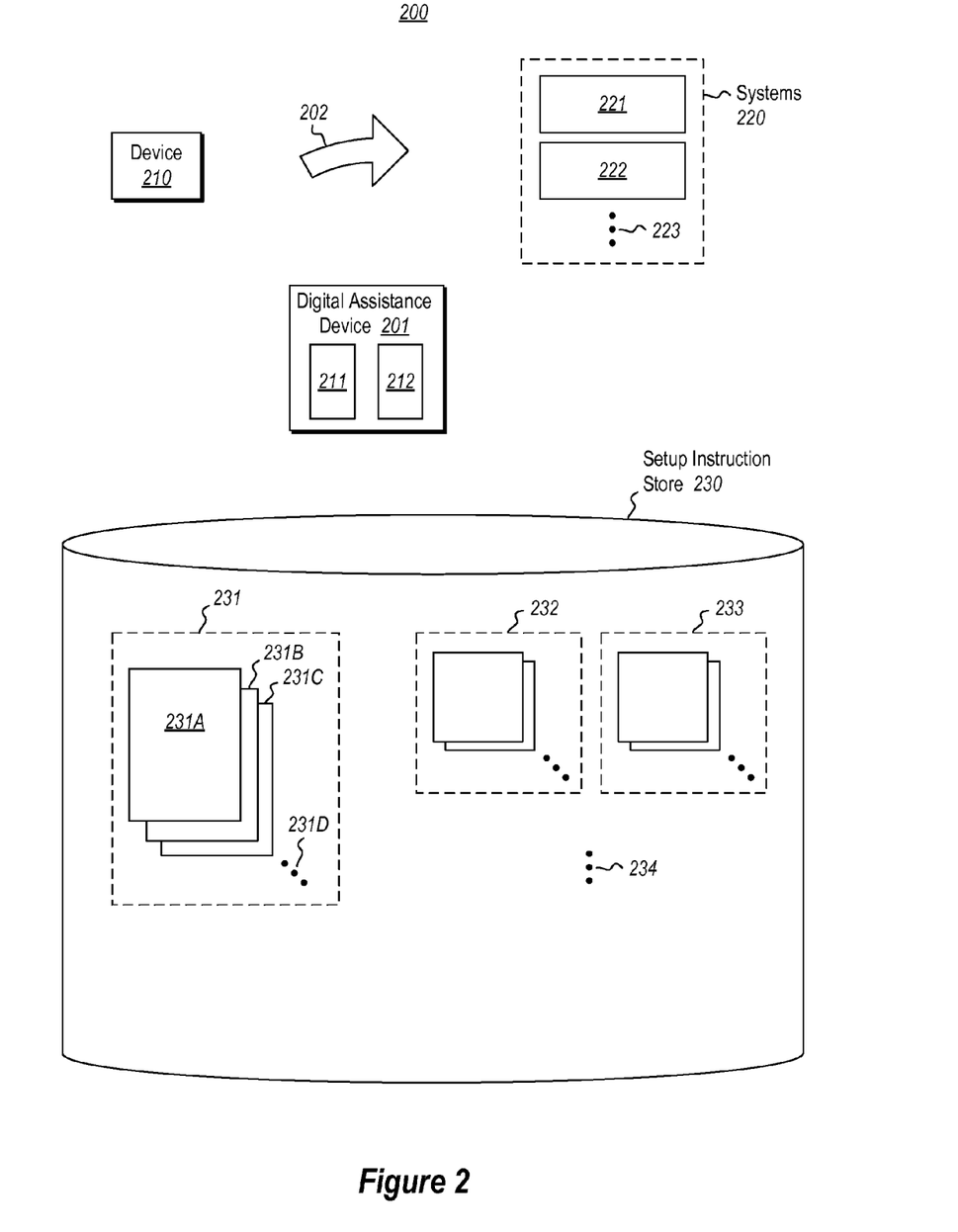
FIG. 2 illustrates an environment in which the principles described herein may be employed, and in which a digital assistance device facilitates at least partially automatic setup of a device within a system of one or more devices using setup instructions provided from a setup instruction store.

FIG. 2 illustrates an environment 200 in which the principles described herein may be employed. The environment 200 includes a digital assistance device 201, a particular device 210 that is to be set up, multiple systems 220, and a setup instruction store 230. As represented by arrow 202, the particular device 201 may be set up to operate with any given one of the multiple systems 220 or with potentially multiple of the systems 220.

Because it does not matter the exact physical form of any of the devices 201 and 210, systems 220, or store 230, these elements are symbolically represented in FIG. 2 as being rectangular forms. The digital assistance device 201 may, for instance, be structured as described above for the computing system 100 and may indeed include a user interface such as the user interface 112 of FIG. 1. The device 210, systems 220, and store 230 may be structured as described for the computing system 100 of FIG. 1, and might or might not include a user interface 112.

The digital assistance device 201 may be any device capable of performing computing and recognizing a command to set up the particular device 210. Although not required, in one embodiment, such a command may be a voice command from a user. In that case, the digital assistance device 201 is capable of digitizing the audio command, and interpreting the digitized audio of the command so as to determine that the particular device is to be set up. The digital assistance device 201 has an executable component 211 that assists in performing the setup process, as well as state 212 that is used by the executable component 211 to perform the setup.

The multiple systems 220 may include any number of systems in which the particular device 210 might potentially be set up into. Each system 220 includes a collection of one or more devices or machines. In some cases, the particular device 210 may be set up to operate in a single system. In other cases, the particular device 210 may be set up to operate in multiple systems. The multiple systems 220 are illustrated as including a first system 221 and a second system 222. However, the ellipses 223 represents that there may be any number of systems with which the particular device 210 may be set up to operate. The user commands to set up the particular device 210, and might also specify the system in which to set up the particular device 210. However, in other embodiments, the digital assistance device 210 uses the state 212 to determine which one or more of the systems 220 that the particular device 201 is to be set up into.

The setup instruction store 230 may be any store that can hold information, but in one embodiment, is a cloud computing environment, such as a public cloud. Cloud computing environments may be distributed, although not required, and may even be distributed internationally and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud" or a "cloud computing environment" is an environment in which cloud computing is employed.

Referring back to the setup instruction store 230 of FIG. 2, the setup instructions include many sets of setup instructions that are illustrated as organized by device to be setup. For instance, the setup instruction store 230 includes setup instructions 231 for the particular device 201. However, there are multiple sets of setup instructions 231A, 231B, 231C, 231D illustrated. This represents that each setup instruction is for setting up a particular device to operate within a particular system. For instance, setup instructions 231A might be for setting up the particular device 201 within the system 221, and the setup instructions 231B might be for setting up the particular device 201 within the system 222. The setup instruction store 230 may include setup instructions for other devices also, such as setup instructions sets 232 and 232, amongst potentially others as well as represented by the ellipses 234. Accordingly, the setup instructions store 230 stores, for each of one or more devices, instructions for setting up the device within each of one or more systems.

Figure 3:
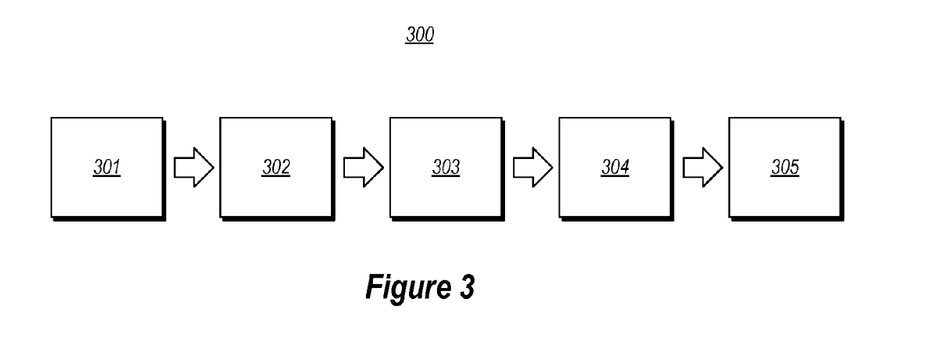
FIG. 3 illustrates multi-stage setup instructions represent an example of multi-stage instructions for setting up a particular device to operate within a particular system of one or more devices.

FIG. 3 illustrates setup instructions 300, which represents an example of multi-stage instructions for setting up a particular device to operate within a particular system of one or more devices. For instance, the setup instructions 300 may be an example of the setup instructions 231A of FIG. 2, and represent setup instructions for setting up the particular device 210 to operate within the system 221.

The setup instructions 300 are multi-stage setup instructions, and in this example, includes five instruction stages 301 through 305 (also called herein "stage setup instructions" or "stage instruction"). However, the number of stages is not critical to the principles described herein. Furthermore, although the five stages 301 through 305 are shown as being performed in series, the principles described herein honor any temporal dependencies between stages. For instance, there may be instances in which a stage of setup may be performed in parallel with another stage of setup. Furthermore, even a given stage may involve multiple tasks. In that case, the principles described herein honor any temporal dependencies between tasks.

Figure 8:
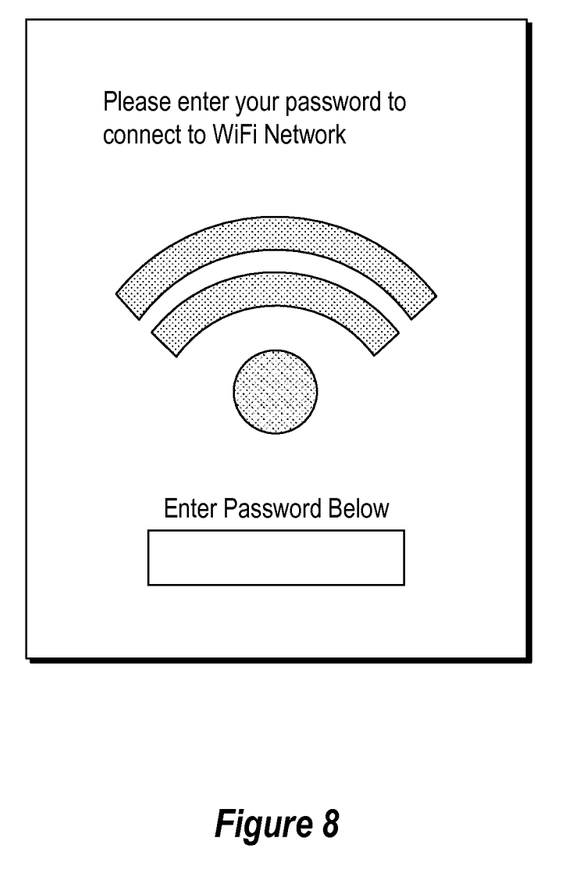
FIG. 8 illustrates an example user interface provided to a user to allow the user to assist with the setup by performing a manual task.

The quick start instructions that typically come with a new product have instructions stages that are manual. In other words, although a computing system or device may be used to perform part of the setup, it is up to the user to interpret the human-readable instructions and follow them. FIG. 8 illustrates an example of an instruction setup stage that is human readable, and is typical of what one might find in a quick start guide. In accordance with the principles described herein, at least one, some and potentially all of the setup stages may be automated. In the example of FIG. 8, the system realizes that it lacks particular data, such as a password, that would allow for a connection to a WiFi network.

Figure 4A:
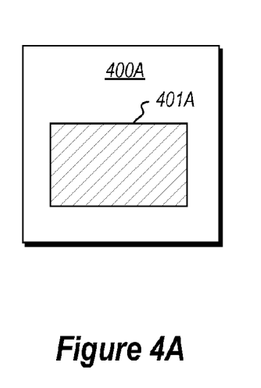
FIG. 4A illustrates an example stage setup instruction in which there are machine-interpretable instructions interpretable by the digital assistance device to automatically perform the corresponding stage of setup.

For instance, suppose that there was a stage that the digital assistance device might be able to perform automatically. The instructions for that stage may be completely machine-readable. For instance, FIG. 4A illustrates a stage instruction 400A for accomplishing a particular stage in the setup of a device to operate with a system, and includes machine-readable instructions 401A. The fact that the instructions 401A are machine-readable is represented by right-leaning hash marking within the box 401A.

In some cases, however, it may not be certain when the setup instructions are being drafted whether or not the digital assistance device will be able to perform the stage of the instruction automatically. For instance, successful automatic performance of the stage may depend on state (e.g., information) being present on the digital assistance device, and/or certain functionality being present on the digital assistance device. When the device manufacturer (of the device 210 to be set up) generates the instructions for setting up that device 210 within the system 221, the device manufacturer may not know what information the digital assistance device will have and/or what functionality it may accomplish.

Figure 4B:
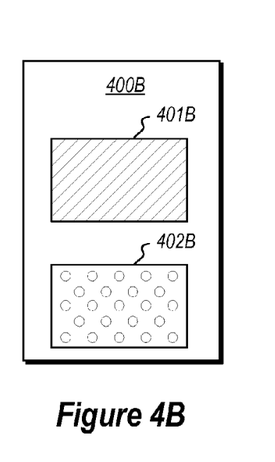
FIG. 4B illustrates another example stage setup instruction in which there are machine-interpretable instructions interpretable by the digital assistance device to attempt to perform or to successfully perform automatic tasks of the stage of setup, and in which there are human-readable instructions that may be rendered to a user so that the user is informed on how to perform a manual task associated with the stage of setup.
Figure 4C:
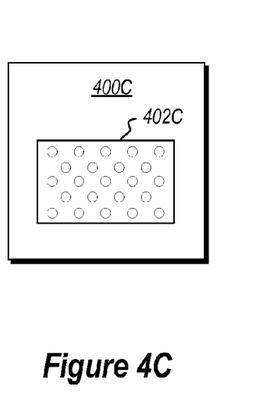
FIG. 4C illustrates another example stage setup instruction in which there are only human-interpretable instructions so that the digital assistance device renders the human-interpretable instructions so that the user can manually perform the state of setup.

Accordingly, in those cases, the stage of instructions may include both machine-readable instructions as well as human-readable instructions. For instance, stage 400B of FIG. B is illustrated as including both machine-readable instructions 401B and human-readable instructions 402B. In this case, the instructions 401B and 402B may be for performing the same part of a task, but the human-readable instructions 402B are provided in case the digital assistance device 201 determines that it cannot automatically perform the task. In FIGS. 4B and 4C, instructions that are human-readable (e.g., via some type of media that is interpretable by human senses as sense of sight, sound, feel, and so forth) are symbolized as a box that contains circles.

Alternatively or in addition, some portions of a stage may be performed automatically, and some portions of a stage may only be performed manually. That would be another reason for have a stage structured as illustrated in FIG. 4B. In that case, the machine-readable instructions 401B may be used for performing one part (an automated part) of a stage, whilst the human-readable instructions 402B may be used for performing another part (a manual part) of the same stage.

FIG. 4C illustrates a stage 400C in which the instructions 402C are entirely human-readable and not machine-readable at all. In this case, the digital assistance device merely renders the human-readable instructions and waits for the user to confirm that they have abided by the instructions. In other cases, rather than wait for confirmation from the user, the digital assistance device is capable of detecting that the user completed the task, even if the digital assistance device is not capable of automatically performing the task.

Figure 5:
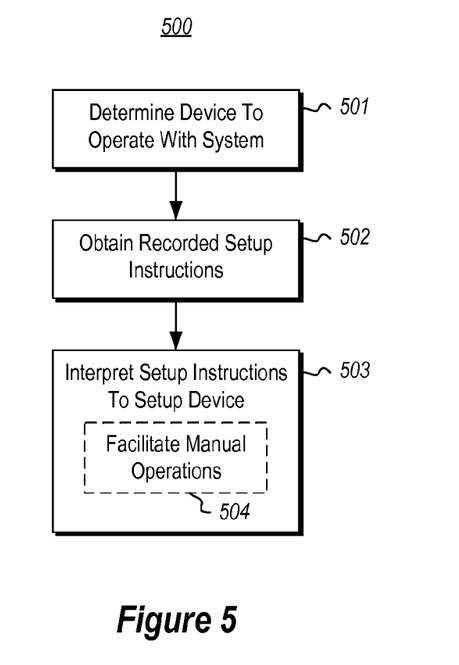
FIG. 5 illustrates a flowchart of a method for setting up a particular device so as to operate within a system of one or more devices while offloading potential manual setup tasks to automation.
Figure 6:
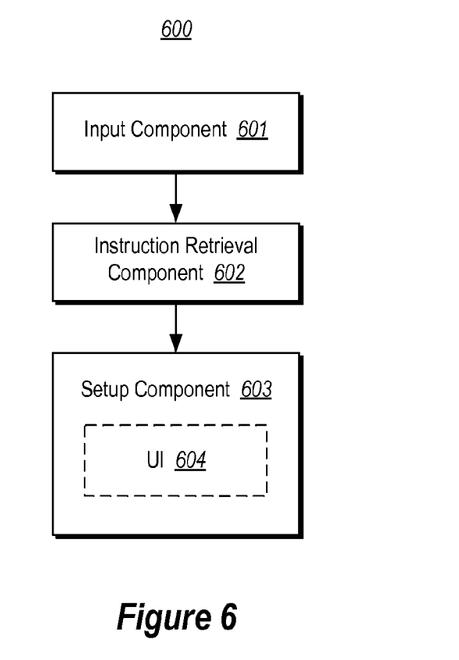
FIG. 6 illustrates an example structure of an executable component of the logic component of the digital assistance device that performs the method of FIG. 5.

FIG. 5 illustrates a flowchart of a method 500 for setting up a particular device so as to operate within a system of one or more devices while offloading potential manual setup tasks to automation. The method 500 may be performed by, for instance, the executable component 211 of the digital assistance device 201 of FIG. 2 using potentially the state 212 of the digital assistance device 201. FIG. 6 illustrate a potential architecture 600 of the executable component 211 of FIG. 2. Accordingly, the execution of the method 500 will now be described with respect to the architecture 600 of FIG. 6.

The method 500 is initiated upon the digital assistance device determining that a particular device is to operate within a system (act 501). This determination may be made by, for instance, the input component 601 of the executable component 600. As an example, the input component 601 may detect user input that represents a user intent to set up the particular device in a particular system. Such might be, for instance, an explicit audible command issued by the user, picked up by a microphone of the digital assistance device 201 and rendered digitally for recognition of the command by the input component 601. Accordingly, the input component 601 may have natural language recognition capability. Such capability is conventionally available, and can be quite sophisticated. As an example, APPLE® Corporation provides SIRI®, MICROSOFT® Corporation provides CORTANA®, Google Company provides GoogleNow™, and AMAZON® provides ALEXA™.

In determining that the particular device is to operate within a system (act 501), the digital assistance device may identify multiple candidate systems in which the particular device might operate. However, the digital assistance device may make a selection of target system to set up the particular device into by interpreting the command as identifying the system, or perhaps using state available to the digital assistance device to select the target system in which the particular device is to operate. In the example of FIG. 2, suppose that the digital assistance device 201 determines that the device 210 is to be set up to operate within the system 221.

In response to this determination that setup is to occur (act 501), the digital assistance device obtains recorded setup instruction describing instructions for multiple stages of setup of the particular device within the system (act 502). In the executable component 600 of FIG. 6, this may be accomplished by the instruction retrieval component 602. Referring to FIG. 6, the instruction retrieval component 602 of the executable component 211 of the digital assistance device 201 may communicate with the setup instruction store to obtain the setup instructions 231A appropriate for setting up the particular device 210 to operate within the system 221. As previously mentioned, the setup instructions 231A may involve multiple stage setup instructions for setting up the particular device 210 to operate within the system 221.

The digital assistance device then interprets the interpretable instructions (act 503) to thereby set up the particular device 210 to operate within the system 221. This may involve automatically performing some stages of setup automatically. This automatic setup may be accomplished by the setup component 603 of the executable component 600 interpreting machine-readable instructions (e.g., instructions 401A) of the stage instruction 400A. This may also involve facilitating manual stages of setup (act 504). This manual setup stage may be facilitated by rendering the human readable content for that stage to the user. For instance, the setup component 603 may cause the user interface component 604 to render the human-readable content of the stage instruction (e.g., content 402C of stage instruction 400C). In other case, a stage may involve one or more tasks that are automatically performed, as well as one or more tasks that are manually performed. In that case, the setup component might, for instance, execute the machine-readable instructions 401B of stage instructions 400B to perform the automated task(s) and render the human-readable instructions 402B via the user interface component 604.

Figure 7:
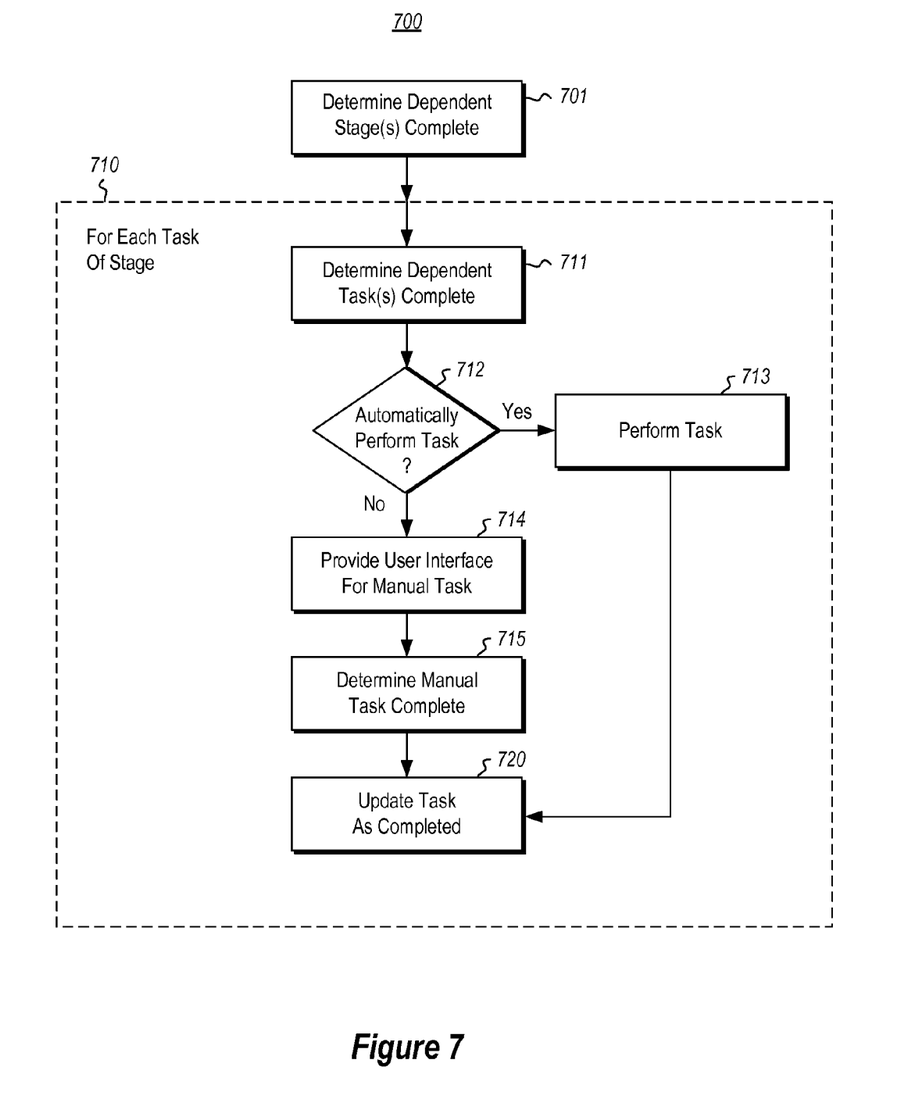
FIG. 7 illustrates a flowchart of a method for processing each stage of the instructions of the multi-stage instructions used to set up the particular device to operate within the system of one or more devices.

FIG. 7 illustrates a method 700 for processing a stage of instructions. For instance, if performing setup involving stage instructions 301 through 305, the method 700 may be performed for each of stage instructions 301 through 305. First, it is determined that all dependent stages have completed (event 701). In the case of FIG. 3, for example, act 701 would be trivial in the case of performing method 700 for stage instruction 301 since that stage has no dependent stages. On the other extreme, in the case of performing stage instructions 305, act 701 would involve confirming that all of the stage instructions 301 through 304 have first been completed (or more simply that the stage instruction 304 has been completed).

The remainder of the method 700 is performed for each task of the stage. A stage itself may involve one or more tasks, and in the case of multiple tasks, those tasks may again have dependencies. Accordingly, for each task, the method 700 involves verifying that the dependent tasks for the particular task has completed (act 711).

The digital assistance device then determines whether or not digital assistance device is to automatically perform the task without contemporaneous human interaction (decision block 712). This determination may be made by determining whether there exist corresponding machine-readable instructions in the stage instructions for that task. If not, then clearly the task cannot be automatically performed. On the other hand, if machine-readable instructions do exist, then perhaps the digital assistance device may attempt to perform the task, but if the task fails to perform automatically, the digital assistance device may determine that manual performance will be performed. Alternatively or in addition, if the machine-readable instructions includes a manifest of state and/or functionality required to complete the task, the digital assistance device may simply determine if it has that state and/or functionality, and if so, attempt to perform the task, and if not, determine that the task is to be performed manually.

If the digital assistance device determines that it can automatically perform the task ("Yes" in decision block 712), the digital assistance device automatically performs (act 713) the task automatically without contemporaneous user intervention. As an example, the digital assistance device might automatically populate one or more fields.

On the other hand, if the digital assistance device determines that it cannot automatically perform the task "No" in decision block 712), the digital assistance device provides user interface (act 714) to facilitate the user performing at least the portion of another of the multiple stages manually. For example, the digital assistance device may present visual aids (such as screenshots, images, video), and/or audio aids (such as audio or video recordings) to a user. Such aids may be present within the human-readable instructions (e.g., human-readable instructions 402B of stage instruction 400B or human-readable instructions 402C of stage instructions 400C. An example, the user may be prompted for a password. In that case, much of the task may be automatically performed with a little manual help (providing the password) from the user.

Once the manual task is completed, the digital assistance device may determine that the task is completed (act 715). This may be done by the user explicitly triggering a control of the user interface, by the digital assistance device identifying a completed state of the user interface, and/or by the digital assistance device using some other information.

Once the digital assistance device automatically performs the task (act 713) or determines that a manual task is completed (act 715), the digital assistance device updates the task status as completed (act 720). This potentially frees up other tasks to be processed through box 710 since this updating may result in dependent being completed for yet other unperformed tasks of the stage. This updating may also be the last task of the entire stage potentially freeing up other stages for being performed. If this was the last task or the last stage, then the setup has been completed entirely.

Accordingly, the digital assistance device at least partially automates the setup process that would usually come in a quick start guide. This is made possible by digitalizing the quick start guide so as to be at least partially interpretable by the digital assistance device. The digital assistance device can thereby determine, for each step, what it can do based on its information and capability, but also how the instructions can be simplified based on what it knows, and for what it cannot do, it passes all or a portion of the quick start guide for that step to the user via an intractable interface. Accordingly, potential manual setup tasks are offloaded to automation, thereby simplifying the setup of a device through technical automation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A digital assistance device comprising:
   an input component that detects user input to the digital assistance device;
   an instruction retrieval component that, upon detecting user input representing that the particular device is to operate within the system, retrieves recorded setup information describing instructions for multiple stages of setup of a particular device within a system of one or more devices; and
   a device setup component that interprets and executes at least a portion of the instructions so that the digital assistance device automatically performs a stage of multiple stages of the instructions without user intervention; and so that the digital assistance device provides a user interface to facilitate the user performing at least another portion of the multiple stages manually.

2. The digital assistance device in accordance with claim 1, the recorded setup instruction for at least one of the multiple stages comprising instructions for a particular stage that include both manual human-readable instructions as well as machine- readable instructions for the same task.

3. The digital assistance device in accordance with claim 1, the recorded setup instruction for a particular stage include manual human-readable instructions for a portion of the particular stage as well as machine-readable instructions for another portion of the particular stage.

4. A method for setting up a particular device so as to operate within a system of one or more devices while offloading potential manual setup tasks to automation, the method comprising:
   an act of a digital assistance device determining that the particular device is to operate within the system;
   in response to the act of determining, an act of the digital assistance device obtaining recorded setup instruction describing instructions for multiple stages of setup of the particular device within the system, the obtained setup instructions for at least part of at least some of the multiple stages being interpretable by the digital assistance device;
   an act of the digital assistance device interpreting the interpretable instructions of the at least some of the multiple stages;
   as a result of the act of interpreting, an act of the digital assistance device automatically performing a particular stage of the multiple stages without contemporaneous user intervention; and
   further as a result of the act of interpreting, an act of the digital assistance device determining that it cannot automatically perform at least a portion of another of the multiple stages without user intervention, and as a result, an act of the digital assistance device providing a user interface to facilitate the user performing at least a portion of the multiple stages manually.

5. The method in accordance with claim 4, the act of the digital assistance device automatically performing the particular stage being performed at least using state already present on the digital assistance device.

6. The method in accordance with claim 4, the act of the digital assistance device automatically performing the particular stage being performed by automatically populating one or more fields to be filled in as part of the particular stage.

7. The method in accordance with claim 4, the act of the digital assistance device providing the user interface comprising an act of presenting visual aids to a user, the visual aids being present within the recorded setup instruction.

8. The method in accordance with claim 7, the visual aids comprising at least one screenshot.

9. The method in accordance with claim 7, the act of the digital assistance device providing the user interface also comprising an act of presenting audio aids to a user, the audio aids being present within the recorded setup instruction.

10. The method in accordance with claim 4, the act of the digital assistance device providing the user interface comprising an act of presenting audio aids to a user, the audio aids being present within the recorded setup instruction.

11. The method in accordance with claim 4, the act of the digital assistance device providing the user interface comprising an act of presenting instructions for a manual act to a user, and presenting a control for the user to indicate when the manual act has completed.

12. The method in accordance with claim 4, the portion comprising setting up an account.

13. The method in accordance with claim 4, the portion comprising interacting with a control on the particular device or on any of the one or more devices of the system.

14. The method in accordance with claim 4, the portion comprising plugging in a connector or plug.

15. The method in accordance with claim 4, the act of the digital assistance device determining that it cannot automatically perform at least a portion of another of the multiple stages without user intervention comprising:
    an act of the digital assistance device attempting to automatically perform the manual task by interpreting machine-readable instructions associated with the manual task.

16. The method in accordance with claim 4, the act of the digital assistance device determining that the particular device is to operate within the system comprising:
    an act of the digital assistance device interpreting data representing an audible command from the user.

17. The method in accordance with claim 4, the act of determining the digital assistance device determining that the particular device is to operate within the system comprising:
    an act of identifying a plurality of systems in which the particular device might operate; and
    an act of using state available to the digital assistance device to select the system that the particular device is to operate with.

18. A computer program product comprising one or more computer-readable hardware storage device having thereon computer-executable instructions that are structured such that, when executed by one or more processors of a digital assistance device, cause the digital assistance device to set up a particular device so as to operate within a system of one or more devices while offloading potential manual setup tasks to automation, the method comprising:
    an act of a digital assistance device determining that the particular device is to operate within the system;
    in response to the act of determining, an act of the digital assistance device obtaining recorded setup instruction describing instructions for multiple stages of setup of the particular device within the system, the obtained setup instructions for at least some of the multiple stages being interpretable by the digital assistance device;
    an act of the digital assistance device interpreting the interpretable instructions of the at least some of the multiple stages;
    as a result of the act of interpreting, an act of the digital assistance device determining that it can automatically perform a stage of the multiple stages without user intervention; and
    further as a result of the act of interpreting, an act of the digital assistance device determining that it cannot automatically perform at least a portion of another of the multiple stages without user intervention, and as a result, an act of the digital assistance device providing a user interface to facilitate the user performing at least a portion of the multiple stages manually.

19. The computer program product in accordance with claim 18, the recorded setup instruction for at least one of the multiple stages comprising instructions for a particular stage that include both manual human-readable instructions as well as machine-readable instructions for the same task.

20. The computer program product in accordance with claim 18, the recorded setup instruction for a particular stage include manual human-readable instructions for a portion of the particular stage as well as machine-readable instructions for another portion of the particular stage.

* * * * *